H. W. MORGAN.
WHEEL.
APPLICATION FILED OCT. 15, 1909.
988,368.
Patented Apr. 4, 1911.
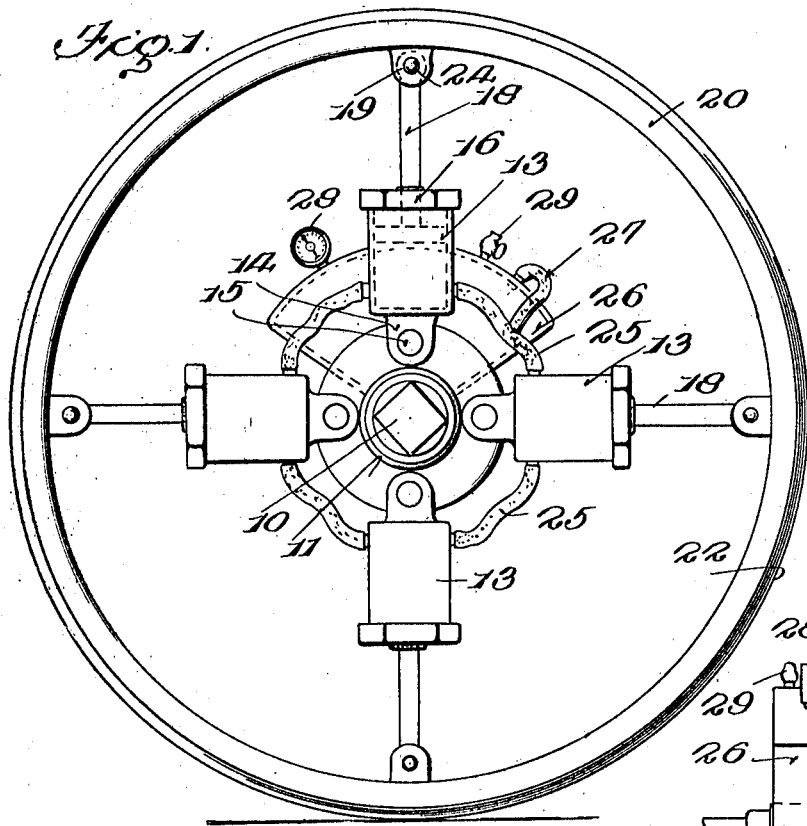
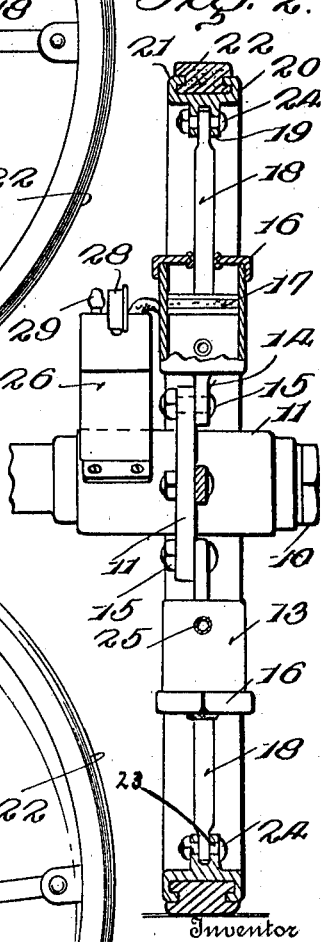
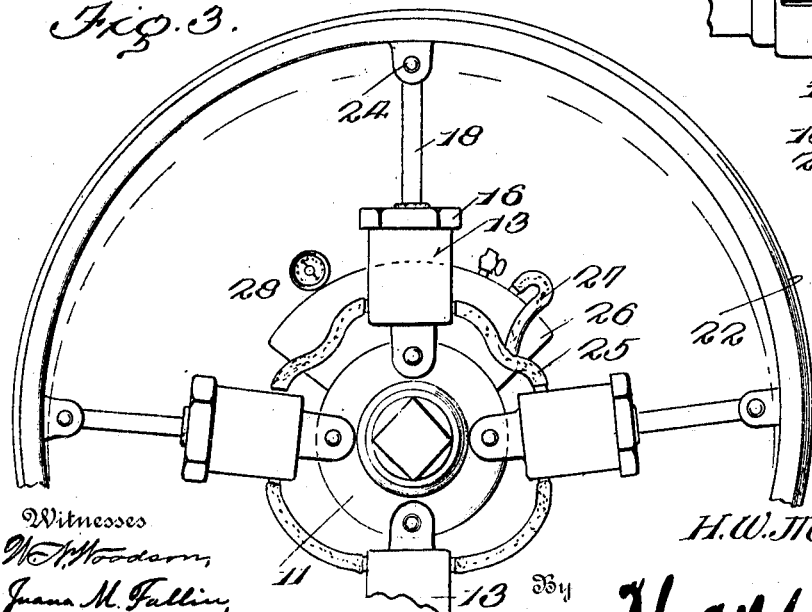
Witnesses
Inventor
H. W. Morgan ic
UNITED STATES PATENT OFFICE.

HENRY W. MORGAN, OF LESTERSHIRE, NEW YORK.

WHEEL.

988,368.     Specification of Letters Patent.      Patented Apr. 4, 1911.

Application filed October 15, 1909. Serial No. 522,830.

*To all whom it may concern:*

Be it known that I, HENRY W. MORGAN, subject of the King of England, residing at Lestershire, in the county of Broome and State of New York, have invented certain new and useful Improvements in Wheels, of which the following is a specification.

This invention relates to wheels, and refers particularly to an improvement in that class of wheels which are known as "resilient wheels."

An object of this invention is to construct a wheel which produces the same effect in traveling as the provision of inflated pneumatic tires about the rim of the wheel and at the same time provides means whereby the pneumatic tire may be eliminated.

The invention has for a further object the provision of a wheel of this character which is provided with a plurality of spokes which are formed in sections and which are disposed in such relation that a body of compressed air is interposed between the sections to resiliently retain the same in a normal position.

The invention has for a still further object the provision of means connected with the spokes whereby a uniform tension is exerted upon the sections of the same so as to provide a wheel which is yieldable to the same degree at each point of its circumference.

For a full understanding of the invention and the merits thereof, reference is to be had to the following description and accompanying drawings, in which:—

Figure 1 is a side elevation of the complete device; Fig. 2 is a vertical section through the same; Fig. 3 is a side elevation of a fragmentary view of the improved wheel disclosed in position when a sudden weight or a jar is exerted upon the center thereof.

Corresponding and like parts are referred to in the following description and indicated in all the views of the accompanying drawings by the same reference characters.

Referring specifically to the drawings the numeral 10 designates an axle which supports the improved wheel and upon which is mounted a suitable hub 11. The hub 11 is provided intermediately with an annular flange 12 which extends outwardly thereabout and supports a plurality of cylinders 13. The cylinders 13 are formed with loops 14 extended from the inner ends thereof and which are suitably apertured for the reception of bolts 15 to pivotally retain the cylinders 13 upon one side of the flange 12. In the drawings the improved wheel is disclosed having but four cylinders, but any number of the same may be employed in accordance with the weight to be placed upon the wheel as the number is limited for the sake of clearness. Each of the cylinders 13 is provided with a cap 16 having the outer face thereof formed into a plurality of flat faces for the reception of an implement to rotate the cap 16 in order to secure the same upon the outer end of the cylinder 13 as the cap 16 and the cylinder 13 are provided with corresponding threaded portions to enable such rotation.

Within each of the cylinders 13 a piston 17 is disposed which is connected to the inner extremity of a piston rod 18 slidably positioned through the cap 16 and extended outwardly from the cylinder 13 where its upper extremity is secured in pivotal relation upon an inwardly projected lug 19 carried by the rim 20 of the wheel. The rim 20, as is disclosed in Fig. 2 of the drawings, is provided with suitable flanges 21 for the retention of a tire 22. The rim 20, however, may be of any desirable form, as this does not materially alter the objects of this invention.

The projection 19 which extends inwardly from the rim 20 is forked or recessed for the reception of a flattened or webbed portion 23 formed upon the outer end of the spoke 18 and is retained between the arms of the projection 19 through the medium of a pivot pin 24. The cylinders 13 in conjunction with the piston rods 18 form the spokes of the wheel. The cylinders 13 are communicated with one another at their inner ends by the provision of a plurality of flexible tubes 25 for communicating the air pressure within the cylinders equally within the same. The hub 11 is provided with a suitable tank 26 for the reception of air under pressure, the tank 26 being provided with a section of tubing 27 which is disposed between the tank 26 and the adjacent tube 25. The tank 26 is provided with an indicator 28 to designate the pressure of air within the tank so that a predetermined pressure may be had within the cylinders in accordance with the weight which is to be disposed upon the axle 10. An air valve 29 is carried by the tank through which the compressed air is led into the same.

In the use of the wheel the tank 26 is provided with an amount of air under pressure through the valve 29 the air being led into the cylinders 13 through the tubes 27 and 25 respectively whence the air is passed through the cylinders 13 and is caused to equalize the pressure of the air against the pistons 17. By the arrangement of the tubes 25 this equal pressure is maintained within the cylinders 13 so as to form a wheel which is uniform in resistance throughout all points at the periphery of the same. When a sudden jar is effected upon the rim 20 the lowermost piston rod 18 is forced inwardly within the cylinder 13 whereby the air within the cylinder 13 is compressed above normal and causes the expulsion of a small amount of the air within the cylinder 13 through the adjacent tubes 25 to the communicating cylinders 13.

As the tubes 25 have relatively small apertures the pistons 17 are permitted, under pressure from the rim of the wheel, to move inwardly and freely through a short distance in the cylinder 13, when the air in the cylinder is compressed more rapidly than it can escape through the tubes 25 and hence a yielding cushion is effected. In admitting of the escape of a small amount of the air successively from the cylinders, as the corresponding piston rod or spoke 18 is forced inwardly, practically all shock is absorbed through the wheel, particularly when the wheel is driven at a high rate of speed, and when an effective cushioning device is most needed.

The number of cylinders 13 and adjacent parts may be as desired, a wheel having only four cylinders being disclosed in the drawings for the purpose of clearness. It is thus seen that even if the wheel is formed with but few spokes and is driven at a low rate of speed, that the action of each cylinder is only momentary, and that sufficient time does not elapse to exhaust the lowermost cylinder proportionately to the weight of the wheel. By increasing the number of spokes in the wheel the cylinders are held in action during a shorter space of time, and hence practically no air escapes into the tubes 25. In admitting of the escape of a small amount of the air from the cylinder the resiliency of the wheel is materially increased. The tubes 25 are also employed in conducting the air under pressure from the tank 26 to the several cylinders 13 employed.

Having thus described the invention, what is claimed as new is;

A wheel including a rim, a relatively small hub disposed centrally of the rim and having a peripheral flange midway of its ends, a plurality of cylinders hinged in spaced relation upon the flange and extending radially from the hub, a corresponding number of elongated piston rods extending inwardly from the rim and into the cylinders, pistons carried upon the inner ends of the piston rods for operation within the cylinders, relatively small tubes communicating the inner extremities of the cylinders, and a source of fluid supply communicating with one of the small tubes.

In testimony whereof I affix my signature in presence of two witnesses.

HENRY W. MORGAN. [L. S.]

Witnesses:
O. H. HITCHCOCK,
WM. B. CARVER.